UNITED STATES PATENT OFFICE.

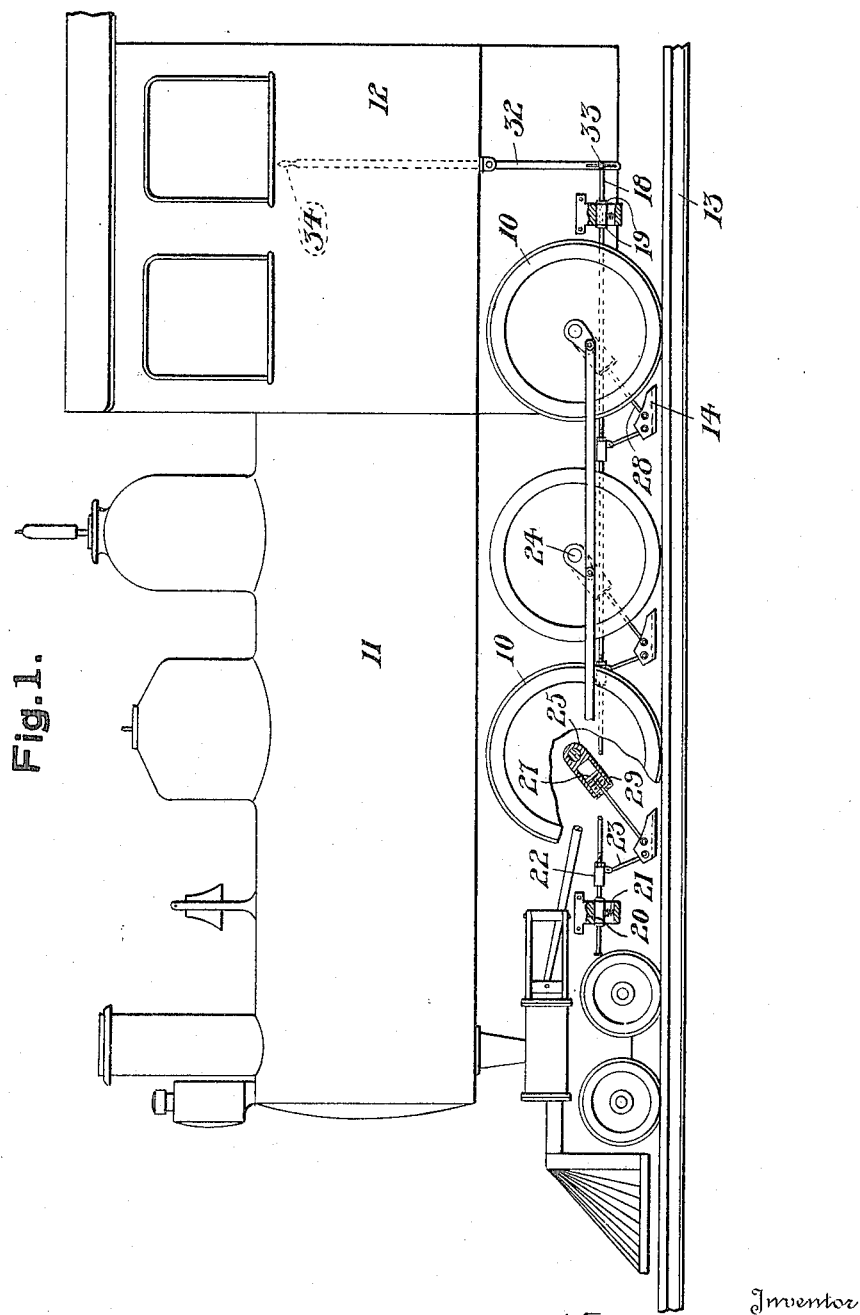

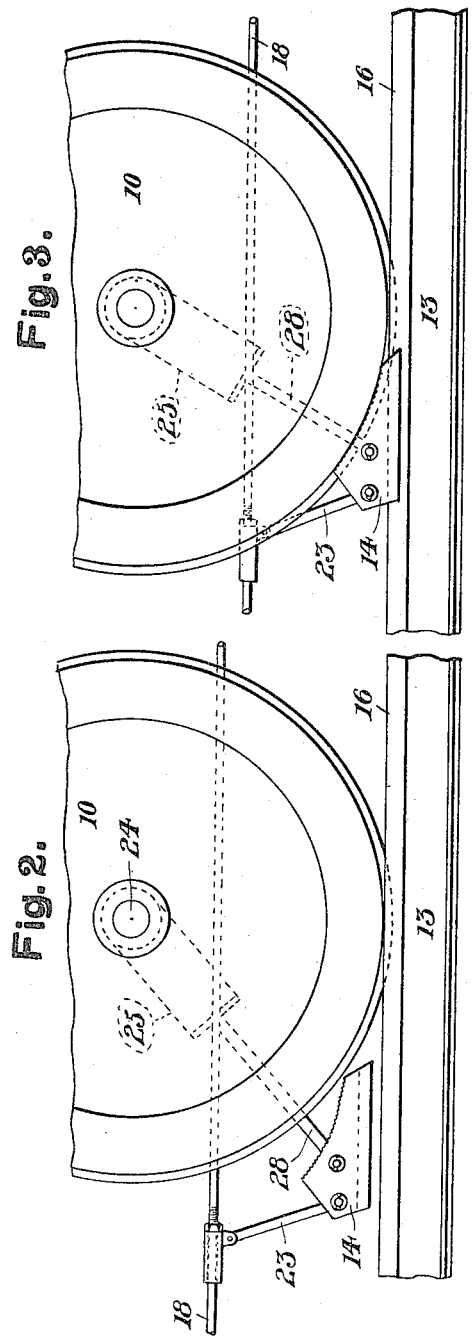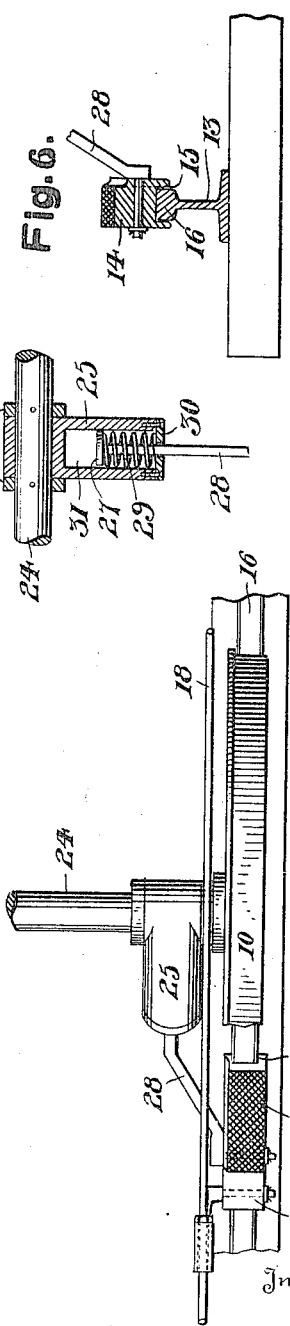

MICHAEL A. KOSTECKI, OF HARTFORD, CONNECTICUT.

RAILWAY-BRAKE.

1,141,125. Specification of Letters Patent. Patented June 1, 1915.

Application filed March 3, 1915. Serial No. 11,807.

*To all whom it may concern:*

Be it known that I, MICHAEL A. KOSTECKI, subject of the Emperor of Austria-Hungary, residing at Hartford, in the county of Hartford and State of Connecticut, have invented certain new and useful Improvements in Railway-Brakes, of which the following is a specification.

This invention relates to certain new and useful improvements in railway brakes.

The primary object of this invention is to provide a brake in the form of wheel-engaging shiftable chock blocks especially adapted for use with wheels which are traveling upon a track and being easily shiftable to their operative positions by the driver or operator of the vehicle which is mounted upon the said wheels.

A further object is the provision of swingingly suspended brake shoes adjacent and forwardly of the running wheels of a railway vehicle such shoes being simultaneously positionable in operative contact between the rails and the said wheels, thereby retarding or entirely stopping the movement of the wheels at the will of the driver of the vehicle.

A still further object is to provide a chock block at each side of a vehicle and resiliently suspended in advance of the wheels thereof by a shiftable bar, and the wheel axles, the said blocks being automatically operatively positioned beneath the said wheels by the driver of the vehicle by a longitudinal movement imparted to the said shiftable bar.

With these general objects in view and others that will appear as the nature of the invention is better understood, the same consists in the novel combination and arrangement of parts hereinafter more fully described, illustrated in the accompanying drawings and pointed out in the appended claims.

In the drawings forming a part of this application and in which like-designating characters refer to corresponding parts throughout the several views, Figure 1 is a side elevation of the locomotive provided with the present invention, portions being broken away. Fig. 2 is an enlarged side elevation of one of the vehicle wheels showing the brake shoe or block in its elevated inoperative position. Fig. 3 is a similar view with the said block operatively positioned beneath the wheel. Fig. 4 is a top plan view of Fig. 3 with the wheel partially broken away. Fig. 5 is a longitudinal sectional view of the resilient connection with the vehicle axle, and Fig. 6 is a vertical sectional detail view through the brake shoe block and the rail upon which it is operatively seated.

Referring more in detail to the drawings, the present invention is herein illustrated in connection with the driving wheels 10 of the locomotive 11 having the engineer's cab 12, it being understood that the locomotive is also provided with oppositely arranged similar wheels all of which are adapted to run upon the usual railway rails 13, and that similar brake mechanisms are provided for the wheels at each side of the vehicle.

Each of the wheels 10 is provided with a brake shoe 14 in the nature of a chock block, being substantially wedge shape and having a longitudinal groove 15 upon the bottom thereof, for seating on the tread portion 16 of the supporting rail as best illustrated in Fig. 6, while the upper surface 17 of the block is curved to conform substantially to the radius of the adjacent wheel and is roughened or corrugated as herein illustrated for affording a better frictional surface for engagement by the said wheel.

A longitudinally shiftable bar 18 is slidably mounted within spaced blocks 19 which are vertically shiftable in brackets 20 secured at convenient points to the locomotive, while the said blocks are normally maintained elevated as best illustrated in Fig. 2 of the drawings by means of expansion springs 21 carried by the brackets 20 and engaging the lower faces of the blocks 19.

Collars 22 are secured to the bar 18 and one being provided for each of the blocks 14, the said blocks being joined to their respective collars by means of connecting rods 23.

Each of the axles 24 of the wheels has a tubular casing 25 journaled thereon between fixed rings 26 and has the enlarged end 27 of a rod 28 shiftably mounted therein and resiliently maintained by means of an expansion spring 29 encircling the said rod and engaging between the head 27 thereof and a closure plate 30 for the casing bore 31. The free end of the rod 28 is pivotally secured to the adjacent chock block 14, thus mounting the block resiliently as best illustrated in Fig. 1. From this arrangement of elements, it will be seen that when the chock blocks are elevated, as shown in Fig. 2, the springs 29 will be under slight tension, such springs then assisting in setting the brakes upon a movement of the actuating lever 34 to be presently described. A rearward sliding movement of the bar 18 results in rearwardly shifting the chock blocks to the position illustrated in Fig. 3, and seating them upon the tread of the adjacent rail and with the adjacent wheel slightly elevated off of the rail and upon the corrugated face 17 of the block which is effected by a riding of the wheel slightly upwardly upon the said block. It will thus be seen that the chock blocks are wedged between the rail and the vehicle wheels by means of the shifting bar 18, while a sufficient rearward movement of the bar provides for a complete braking or blocking of the wheels by the resultant elevating thereof. Such positioning of the shoe blocks 14 results in compressing the bracket springs 21 and the bar 18 is lowered as illustrated in Fig. 3, the disk 27 moving to its innermost position within its mounting casing 25 assisted by the spring 29.

An operating lever 32 has a pivotal connection 33 with the rear end of the block shifting bar 18 and is readily manipulated by the engineer within the cab 12 by moving the handle 34 at the upper end of the said lever.

The mechanism herein described being identical upon opposite sides of the locomotive, it will be seen that two similar operating levers 32 may be provided although a single operating lever (not shown) may be designed and employed for simultaneously shifting the bars 18 at the opposite sides of the vehicle and thus insuring a simultaneous engagement of the chock block with each of the six wheels thereof.

While the form of the invention herein shown and described is what is believed to be the preferred embodiments thereof, it is nevertheless to be understood that minor changes may be made without departing from the spirit and scope of the invention as claimed.

What I claim as new is:—

1. A railway brake comprising a shiftable bar, vertically movable resiliently mounted journaling means for the said bar, casings journaled to the axles of a vehicle, substantially triangular shaped chock blocks, connecting rods having their lower ends pivoted to the said blocks and their upper ends resiliently mounted within the said casings, and supporting rods pivotally connected between the said bar and blocks.

2. A vehicle brake comprising mounting brackets, shiftable blocks carried by said brackets, resilient mounting means for the said blocks, a longitudinally shiftable supporting bar journaled in the said blocks, a triangular shaped brake shoe having a longitudinal bottom groove and a corrugated curved upper portion and positioned forwardly of a vehicle wheel, a collar secured to said bar, pivotal connections between the said shoe and collar, a casing journaled upon the axle of the said wheel and having a recess therein, a connecting rod having one end pivoted to the said shoe and its other end mounted within the said recess, resilient mounting means within the said recess engaging the end of said rod positioned therein, and longitudinal shifting means for the said bar.

In testimony whereof I affix my signature in presence of two witnesses.

MICHAEL A. KOSTECKI.

Witnesses:
 CHAS. B. NOMIJKO,
 JAN ROMANSWSKY.

Copies of this patent may be obtained for five cents each, by addressing the "Commissioner of Patents, Washington, D. C."